(12) United States Patent
Kim et al.

(10) Patent No.: US 8,010,229 B2
(45) Date of Patent: Aug. 30, 2011

(54) METHOD AND APPARATUS FOR RETURNING CLEANING ROBOT TO CHARGE STATION

(75) Inventors: Hyung Joo Kim, Daejeon (KR); Chang Gyu Lim, Daejeon (KR); Sung Ho Im, Daejeon (KR); Dong Sun Lim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 971 days.

(21) Appl. No.: 11/982,246

(22) Filed: Nov. 1, 2007

(65) Prior Publication Data

US 2008/0133054 A1 Jun. 5, 2008

(30) Foreign Application Priority Data

Dec. 5, 2006 (KR) .......... 10-2006-0122329
Feb. 6, 2007 (KR) .......... 10-2007-0012253

(51) Int. Cl.
 *G06F 19/00* (2006.01)
(52) U.S. Cl. ........ 700/245; 700/258; 700/259; 700/262; 318/568.12; 318/587; 318/568.1; 318/568.11; 318/568.16; 901/1; 901/46; 901/47; 701/23; 701/25; 701/300; 180/167; 414/227
(58) Field of Classification Search .......... 700/245, 700/262, 258, 259; 318/568.12, 587, 568.1, 318/568.11, 568.16; 901/1, 46, 47; 701/23, 701/25, 300; 15/319, 340.1; 134/18, 24, 134/167 R; 118/52, 500; 396/611, 667; 180/167; 414/227
See application file for complete search history.

(56) References Cited

U.S. PATENT DOCUMENTS

| | | | |
|---|---|---|---|
| 4,772,837 A * | 9/1988 | MacMunn | 318/687 |
| 5,440,216 A * | 8/1995 | Kim | 318/587 |
| 5,534,762 A | 7/1996 | Kim | |
| 5,646,494 A * | 7/1997 | Han | 318/587 |
| 5,867,800 A * | 2/1999 | Leif | 701/23 |

(Continued)

FOREIGN PATENT DOCUMENTS

JP 2002-318620 10/2002

(Continued)

*Primary Examiner* — James P Trammell
*Assistant Examiner* — McDieunel Marc
(74) *Attorney, Agent, or Firm* — Blakely, Sokoloff, Taylor & Zafman

(57) ABSTRACT

Provided are a method and apparatus for ensuring a cleaning robot to return to a charge station. The method includes the steps of: (a) measuring a battery usable time, a running speed, and an actual return distance of a cleaning robot during a cleaning operation; (b) calculating an allowable return distance on the basis of the battery usable time and the running speed; (c) comparing the actual return distance with the allowable return distance; and (d) returning the cleaning robot to the charge station when the actual return distance is larger than the allowable return distance as a result of the comparison. Therefore, it is possible to prevent the cleaning robot from being not returned to the charge station, thereby providing convenience to a user.

17 Claims, 5 Drawing Sheets

U.S. PATENT DOCUMENTS

| | | | | |
|---|---|---|---|---|
| 5,995,884 A | * | 11/1999 | Allen et al. | 701/24 |
| 6,389,329 B1 | | 5/2002 | Colens | |
| 6,476,574 B1 | * | 11/2002 | Nilsson et al. | 318/568.11 |
| 6,957,712 B2 | * | 10/2005 | Song et al. | 180/167 |
| 7,438,766 B2 | * | 10/2008 | Song et al. | 134/18 |
| 7,514,902 B2 | * | 4/2009 | Tsuchiya et al. | 320/132 |
| 2005/0200312 A1 | * | 9/2005 | Komiya et al. | 315/291 |
| 2006/0087291 A1 | * | 4/2006 | Yamauchi | 320/137 |
| 2007/0001647 A1 | * | 1/2007 | D'Avanzo et al. | 320/132 |
| 2007/0096676 A1 | * | 5/2007 | Im et al. | 318/587 |
| 2008/0012310 A1 | * | 1/2008 | Weaver et al. | 285/288.1 |
| 2008/0134458 A1 | * | 6/2008 | Ziegler et al. | 15/320 |
| 2008/0140255 A1 | * | 6/2008 | Ziegler et al. | 700/245 |

FOREIGN PATENT DOCUMENTS

| | | |
|---|---|---|
| JP | 2006-285547 | 10/2006 |
| KR | 2004-0063247 | 7/2004 |
| KR | 1020040063248 A | 7/2004 |
| KR | 2005-0075827 | 7/2005 |
| KR | 2005-0110128 | 11/2005 |
| KR | 1020060027721 A | 3/2006 |
| KR | 2006-285547 | 10/2006 |

* cited by examiner

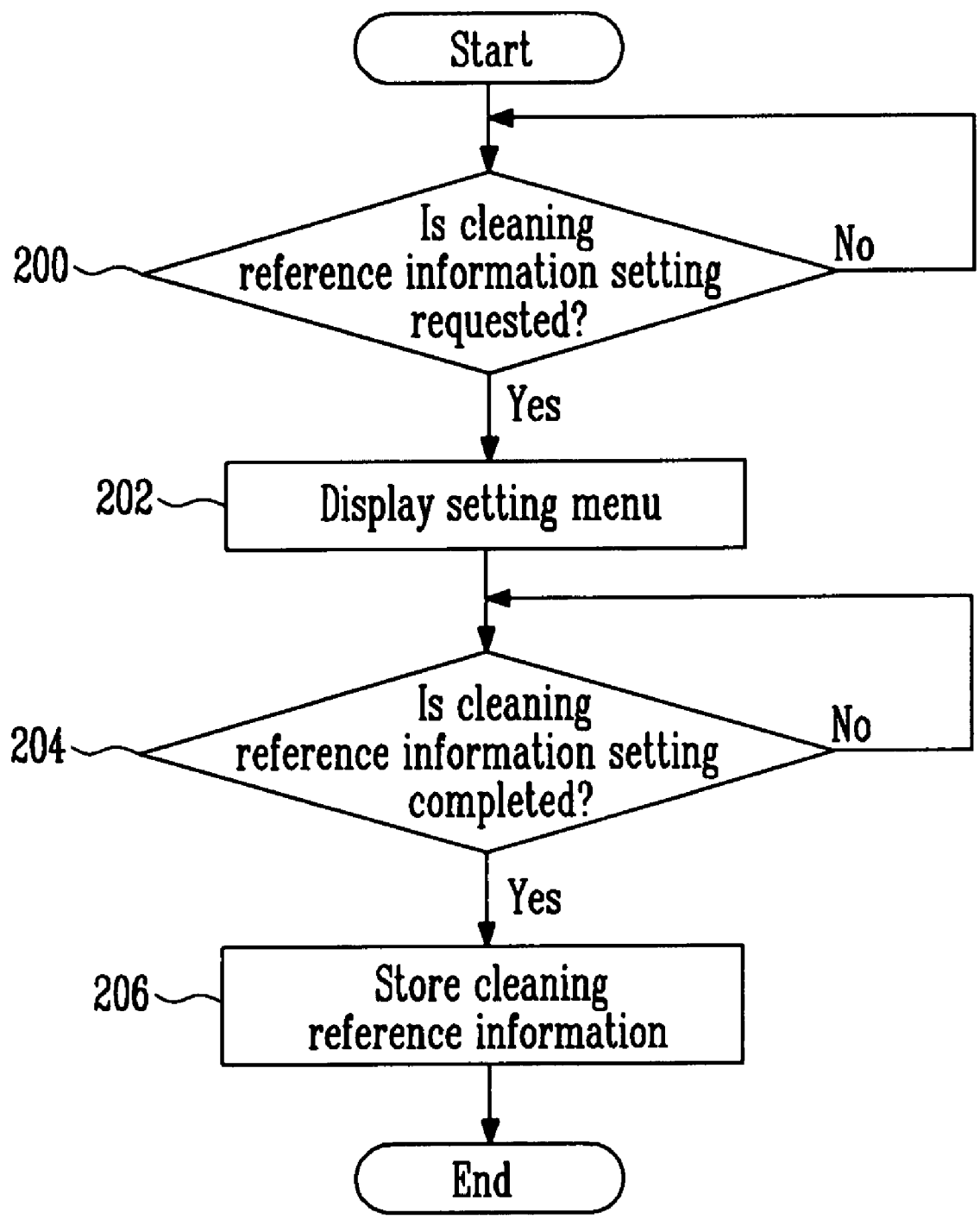

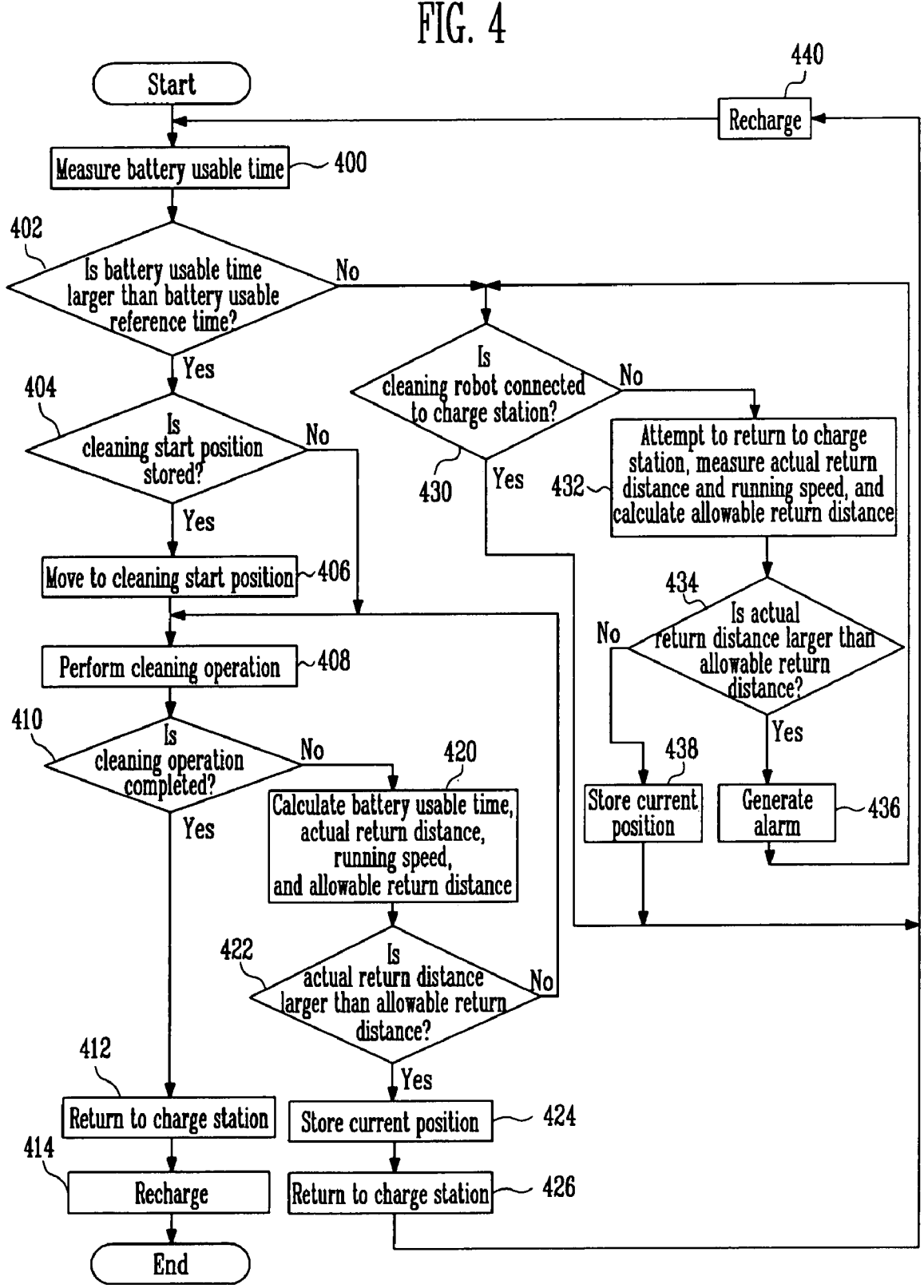

METHOD AND APPARATUS FOR RETURNING CLEANING ROBOT TO CHARGE STATION

CROSS-REFERENCE TO RELATED APPLICATION

This application claims the benefit of Korean Patent Application No. 2006-122329, filed Dec. 5, 2006, and No. 2007-12253, filed Feb. 6, 2007, the disclosure of which is hereby incorporated herein by reference in its entirety.

BACKGROUND

1. Field of the Invention

The present invention relates to a method and apparatus for recharging a cleaning robot, and more particularly, to a method and apparatus for ensuring a cleaning robot to return to a charge station.

The present invention has been produced from the work supported by the IT R&D program of MIC (Ministry of Information and Communication)/IITA (Institute for Information Technology Advancement) [2005-S-026-02, Development of Embedded Software Platform and Middleware for URC] in Korea.

2. Discussion of Related Art

Generally, a cleaning robot is equipped with a rechargeable battery to automatically make a round in an interior space to clean the interior space. The cleaning robot equipped with the rechargeable battery performs a cleaning operation by automatically making the round in the interior space, and checks a voltage level of the battery by measuring the voltage of the battery to determine a battery recharge time at predetermined time intervals. When the battery recharge time is detected, the robot should return to a charge station, positioned at one corner of the interior, to automatically recharge the battery.

When the voltage of the battery becomes lower than a certain level, a conventional cleaning robot stops a cleaning operation and moves to the charge station by recognizing robot position information and charger position information stored in a controller. However, when a recharge time of the cleaning robot is determined using the battery voltage only, there is no problem when a distance between the cleaning robot and the charge station is short; whereas if the station is too far away, the battery may be fully exhausted while returning to the charge station so that the cleaning robot stops before arriving at the charge station. In addition, when a bottom surface of the interior in which the cleaning robot moves is too slippery to perform the cleaning operation, the battery of the cleaning robot may be exhausted to make it impossible to return to the charge station and perform the cleaning operation, thereby causing inconvenience to a user.

SUMMARY OF THE INVENTION

The present invention is directed to an apparatus and method for ensuring a cleaning robot to return to a charge station.

An aspect of the present invention provides a method for returning a cleaning robot to a charge station, including the steps of: (a) measuring a battery usable time, a running speed, and an actual return distance of a cleaning robot during a cleaning operation; (b) calculating an allowable return distance on the basis of the battery usable time and the running speed; (c) comparing the actual return distance with the allowable return distance; and (d) returning the cleaning robot to the charge station when the actual return distance is larger than the allowable return distance as a result of the comparison.

Another aspect of the present invention provides a method for returning a cleaning robot to a charge station, including the steps of: (a) measuring a battery usable time when a cleaning robot is booted; (b) determining whether the cleaning robot is connected to the charge station when the measured battery usable time is less than a battery usable reference time; (c) starting to return to the charge station when the cleaning robot is not connected to the charge station, and measuring a running speed of the cleaning robot and an actual return distance; (d) calculating an allowable return distance on the basis of the battery usable time and the running speed; (e) comparing the actual return distance with the allowable return distance; and (f) generating an alarm when the actual return distance is larger than the allowable return distance as a result of the comparison.

Still another aspect of the present invention provides an apparatus for returning a cleaning robot to a charge station, including: a battery detection part for measuring a battery usable time of a cleaning robot; a running speed detection part for measuring a running speed of the cleaning robot; a return distance detection part for measuring an actual return distance of the cleaning robot; and a controller for comparing the actual return distance with an allowable return distance, and returning the cleaning robot to the charge station when the actual return distance is larger than the allowable return distance.

Yet another aspect of the present invention provides an apparatus for returning a cleaning robot to a charge station, including: a battery detection part for measuring a battery usable time of the cleaning robot when the cleaning robot is booted; a running speed detection part for measuring a running speed of the cleaning robot; a return distance detection part for measuring an actual return distance of the cleaning robot; and a controller for calculating an allowable return distance on the basis of the battery usable time and the running speed when the battery usable time is less than a battery usable reference time and the cleaning robot is not connected to the charge station, and outputting an alarm when the actual return distance is larger than the allowable return distance.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 2 is a control flowchart for setting cleaning reference information of the cleaning robot in accordance with an exemplary embodiment of the present invention;

FIG. 4 is a flowchart showing a control process of returning the cleaning robot to the charge station in accordance with an exemplary embodiment of the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein.

Figure 1:
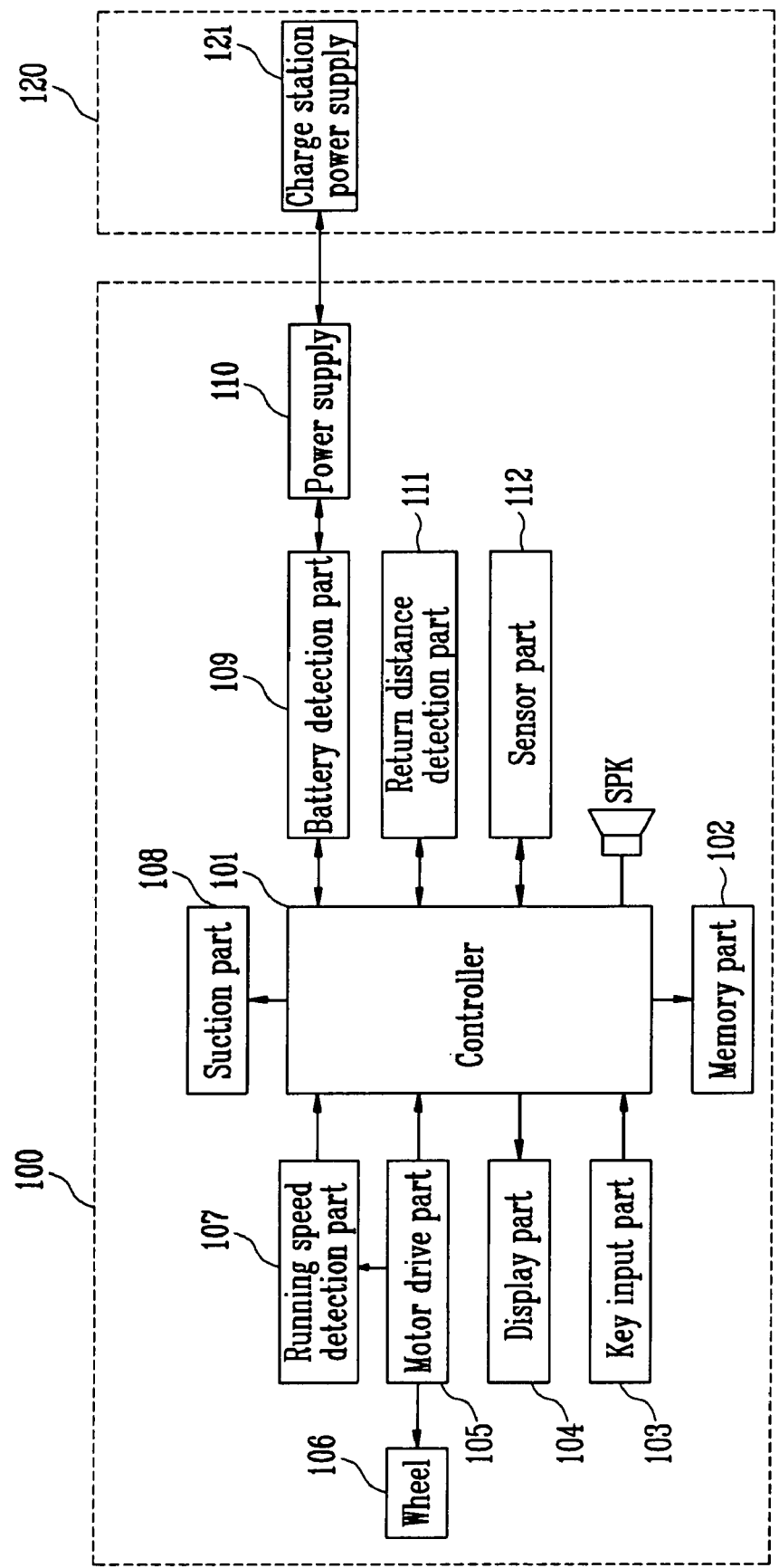
FIG. 1 is a block diagram of a cleaning robot and a charge station in accordance with an exemplary embodiment of the present invention.

FIG. 1 is a block diagram of a cleaning robot and a charge station in accordance with an exemplary embodiment of the present invention. Hereinafter, basic configuration and operation of a cleaning robot 100 and a charge station 120 in accordance with an exemplary embodiment of the present invention will be described with reference to FIG. 1.

A controller 101 processes various functions of the cleaning robot 100. In particular, the controller 101 in accordance with an exemplary embodiment of the present invention receives a battery usable time measured by a battery detection part 109, a distance between the cleaning robot 100 and the charge station 120 measured by a return distance detection part 111, and a running speed of the cleaning robot 100 measured by a running speed detection part 107 during a cleaning operation, and compares the distance between the cleaning robot 100 and the charge station 120 with an allowable return distance calculated by the following Formula 1.

Allowable return distance=Battery usable time×
Running speed−Allowable moving distance    [Formula 1]

Hereinafter, the distance between the cleaning robot 100 and the charge station 120 will be referred to as an 'actual return distance'. In this process, the allowable return distance is a distance for correcting an error, which may be generated due to a slippery surface on which the cleaning robot 100 moves, or a calculation error of the distance to the charge station 120 due to direction changes of the cleaning robot 100. At this time, when the actual return distance is larger than the allowable return distance, a current position of the cleaning robot 100 is stored in a memory part 102, and the cleaning robot 100 returns to the charge station 120. In addition, the controller 101 generates an alarm through a speaker SPK to allow a user to guide the cleaning robot 100 to the charge station 120.

The memory part 102 provides a region for storing micro codes of a program for processing and controlling the controller 101, and various storage data. In particular, the memory part 102 in accordance with an exemplary embodiment of the present invention stores cleaning reference information such as a battery usable time, an allowable moving distance, and so on. The cleaning reference information may be set by a user or previously set. For example, the user may set the allowable moving distance on the basis of a bottom material of a space to be cleaned.

A key input part 103 includes various keys to provide key input data corresponding to a key pressed by a user on the controller. In particular, in accordance with an exemplary embodiment of the present invention, the user may set the cleaning reference information using keys installed at the key input part 103. A display part 104 displays an image representing various operation information provided from the controller 101 under control of the controller 101.

A motor drive part 105 drives wheels 106 to move the cleaning robot in any direction under control of the controller 101. The running speed detection part 107 measures the speed of the wheels 106 using a speedometer and so on to output the speed to the controller 101. While the motor drive part 105 and the running speed detection part 107 in accordance with the present invention are shown in a divided manner for ease of understanding, the motor drive part 105 may include the running speed detection part 107.

A suction part 108 drives a motor installed therein to suck dust and so on under control of the controller 101. A power supply 110 is connected to a power supply 121 of the charge station 120 to recharge required power to the battery for operating the cleaning robot 100. The battery detection part 109 periodically measures remaining power of the battery installed in the power supply 110 and outputs the data to the controller 101. While the power supply 110 and the battery detection part 109 in accordance with the present invention are shown in a divided manner for ease of understanding, the power supply 110 may include the battery detection part 109.

A sensor part 112 generates an ultrasonic wave and so on and detects the ultrasonic wave reflected by an object. The returning distance detection part 111 measures the distance between the cleaning robot 100 and the charge station 120 and then outputs the data to the controller 101. A method of measuring the distance between the cleaning robot 100 and the charge station 120 may be implemented using technology well-known in this field, so description of a specific measuring process will be omitted. The charge station power supply 121 is connected to the power supply 110 of the cleaning robot 100 to transmit power required for operating the cleaning robot 100 to the cleaning robot 100.

Figure 3A:
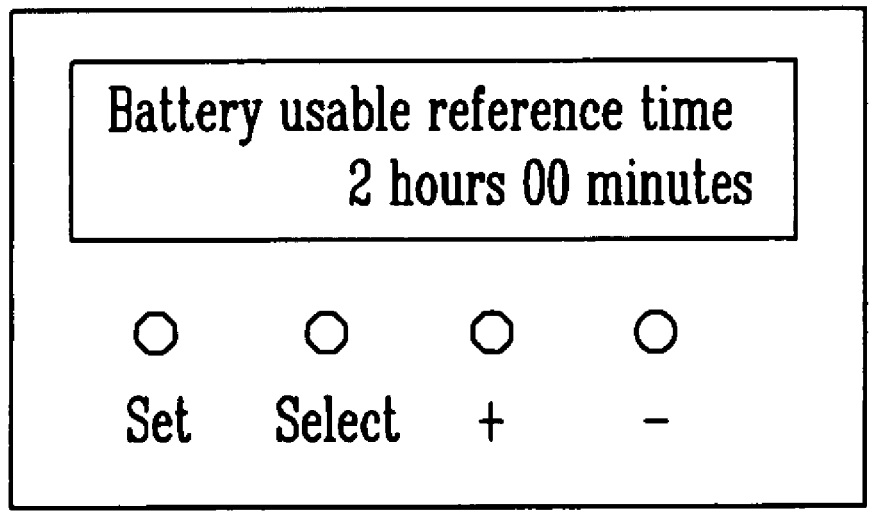
FIGS. 3A and 3B show screens for setting the cleaning reference information of the cleaning robot in accordance with an exemplary embodiment of the present invention.
Figure 3B:
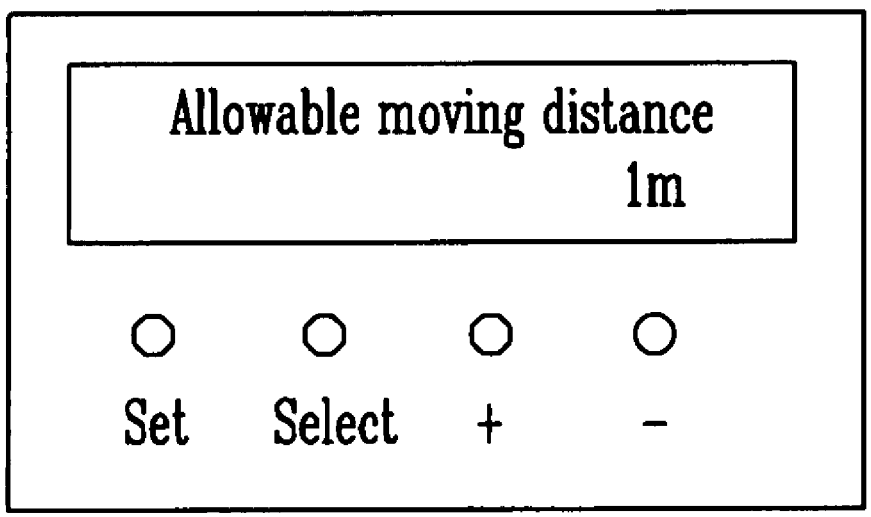

FIG. 2 is a control flowchart for setting cleaning reference information of the cleaning robot in accordance with an exemplary embodiment of the present invention, and FIGS. 3A and 3B show screens for setting the cleaning reference information of the cleaning robot in accordance with an exemplary embodiment of the present invention. Hereinafter, a method for setting cleaning reference information of the cleaning robot 100 will be described with reference to FIGS. 2, 3A and 3B.

During step 200 of FIG. 2, the controller 101 determines whether a request for setting cleaning reference information of the cleaning robot 100 is applied through the key input part 103 by a user. When the cleaning reference information setting request is applied, the controller 101 performs step 202. In step 202, the controller 101 displays a management screen for enabling a user to set the cleaning reference information through the display part 104 and then performs step 204. In step 204, the controller 101 determines whether a user sets cleaning reference information. When the user sets the cleaning reference information, the controller performs step 206. In step 206, the controller 101 stores the cleaning reference information set by the user in the memory part 102 and completes the cleaning operation.

Hereinafter, the method of setting cleaning reference information will be described with reference to FIG. 3.

FIG. 3A shows an example of a management screen for enabling a user to set a battery usable reference time of the cleaning robot, and FIG. 3B shows an example of a management screen for enabling a user to set an allowable moving distance of the cleaning robot 100. When a user sets the battery usable reference time to "2 hours 00 minutes" as shown in FIG. 3A, the cleaning robot returns to the charge station 120 to recharge the battery when the remaining battery capacity is less than two hours in booting the cleaning robot 100, and then starts to perform a cleaning operation after recharging the battery in the charge station until the remaining battery capacity arrives at two hours.

Figure 5A:
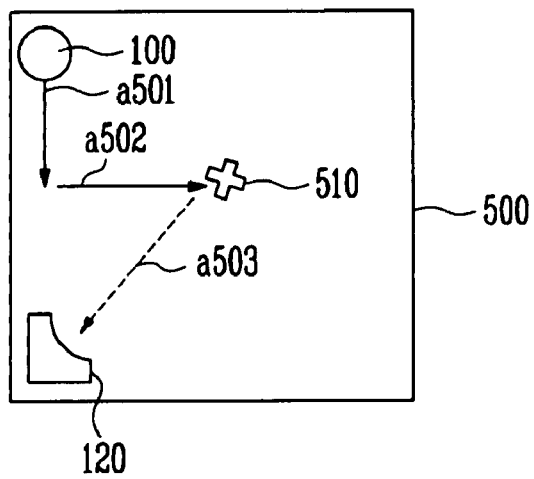
FIGS. 5A to 5C are views showing a process of returning the cleaning robot to the charge station in accordance with an exemplary embodiment of the present invention.
Figure 5B:
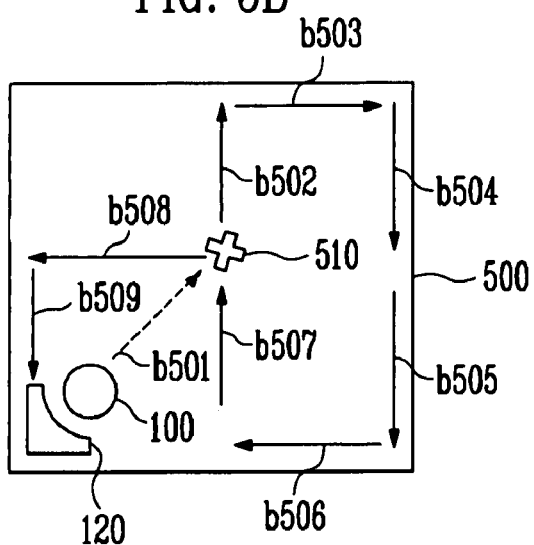
Figure 5C:
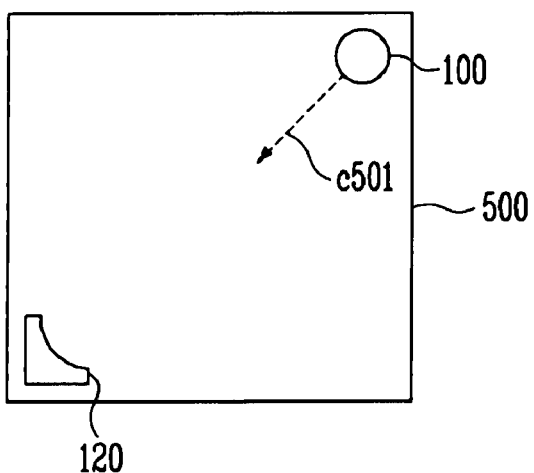

FIG. 4 is a flowchart showing a control process of returning the cleaning robot to the charge station in accordance with an exemplary embodiment of the present invention, and FIGS. 5A to 5C are views showing a process of returning the cleaning robot to the charge station in accordance with an exemplary embodiment of the present invention. Hereinafter, a process of returning the cleaning robot 100 to the charge station 120 in accordance with an exemplary embodiment of the present invention will be described with reference to FIGS. 4 and 5A to 5C.

In step 400 of FIG. 4, the controller 101 periodically receives a battery usable time measured by the battery detection part 109 and then performs step 402. In step 402, the controller 101 compares the battery usable time with a battery usable reference time. When the battery usable time is larger than the battery usable reference time, the controller 101 moves to step 404, and when the battery usable time is less than the battery usable reference time, the controller 101 performs step 430.

In step 404, the controller 101 determines whether a cleaning start position is stored in the memory part 102. When the cleaning memory part is stored, the controller performs step 406, and when not stored, the controller 101 performs step 408. In step 406, the controller 101 moves the cleaning robot 100 to the cleaning start position stored in the memory part 102. In step 408, the controller 101 begins a cleaning operation.

In step 410, the controller 101 determines whether the cleaning operation is completed. When the cleaning operation is completed, the controller 101 performs step 412, and when not completed, the controller 101 performs step 420. In step 412, the controller 101 returns the cleaning robot 100 to the charge station 120. In step 414, the controller 101 recharges the cleaning robot 100 and completes the cleaning operation.

Meanwhile, in step 420 performed by determining that the cleaning operation is not completed during step 410, the controller 101 receives a battery usable time measured by the battery detection part 109, an actual return distance measured by the return distance detection part 111, and a running speed measured by the running speed detection part 107, calculates an allowable return distance using Formula 1, and then performs step 422. In step 422, the controller 101 compares the actual return distance with the allowable return distance. When the actual return distance is larger than the allowable return distance, the controller 101 performs step 424, and when the actual return distance is smaller than the allowable return distance, the controller 101 performs step 408. In step 424, the controller 101 stores a current position of the cleaning robot 100 in the memory part 102, and performs step 426.

In step 426, the controller 101 returns the cleaning robot 100 to the charge station 120, and performs step 440. In step 440, the controller 101 recharges the cleaning robot 100, and performs step 400.

Meanwhile, in step 430 performed as a result of the determination that the battery usable time is less than the battery usable reference time in step 402, the controller 101 determines whether the cleaning robot 100 is connected to the charge station 120. When the cleaning robot 100 is connected to the charge station 120, the controller 101 performs step 440, and when not connected to the charge station 120, the controller 101 performs step 432.

In step 432, the controller 101 attempts to return the cleaning robot 100 to the charge station 120, receives a running speed of the cleaning robot 100 measured by the running speed detection part 107 and an actual return distance measured by the return distance detection part 111, calculates an allowable return distance using Formula 1, and then performs step 434.

In step 434, the controller 101 compares the actual return distance with the allowable return distance. When the actual return distance is larger than the allowable return distance, the controller 101 performs step 436, and when the actual return distance is smaller than the allowable return distance, the controller 101 performs step 438. In step 438, the controller 101 generates an alarm through the speaker SPK, and performs step 430.

Meanwhile, in step 438 performed as a result of step 434, the controller 101 returns the cleaning robot 100 to the charge station 120, and performs step 440.

Hereinafter, a method of setting cleaning reference information will be described with reference to FIGS. 5A to 5C.

FIG. 5A is a view showing a process of returning the cleaning robot 100 to the charge station 120 to recharge the battery during a cleaning operation in a cleaning region 500. When it is determined that an actual return distance of the cleaning robot 100 is larger than the allowable return distance during cleaning operations a501 and a502, a current position 510 of the cleaning robot 100 is stored, and the cleaning robot 100 returns (as shown in a dotted arrow a503) to the charge station 120 to recharge the battery.

FIG. 5B is a view showing a process of returning the cleaning robot 100 to the charge station 120 after recharging the battery, moving to the stored cleaning start position 510, and completing cleaning operations b502 to b509.

FIG. 5C is a view showing a process (steps 430 to 438 of FIG. 4) of returning (as shown in a dotted arrow c501) the cleaning robot 100 to the charge station 120 when the battery usable time in booting the cleaning robot 100 is less than the battery usable reference time. At this time, when the actual return distance is larger than the allowable return distance, the cleaning robot 100 generates an alarm and attempts to return to the charge station 120. When a user hears the alarm, moves the cleaning robot 100 and connects the cleaning robot 100 to the charge station 120, a battery recharge operation is initiated (steps 430 to 440 performed as a result of step 436). Meanwhile, when the actual return distance is smaller than the allowable return distance, the cleaning robot 100 returns to the charge station 120 to recharge the battery.

As can be seen from the foregoing, the present invention improves a method for returning a cleaning robot to a charge station to prevent the cleaning robot from not returning to the charge station, thereby providing convenience to a user.

Although the present invention has been described with reference to certain exemplary embodiments thereof, it will be understood by those skilled in the art that a variety of modifications and variations may be made to the present invention without departing from the spirit and scope of the present invention as defined in the appended claims and their equivalents.

What is claimed is:

1. A method for returning a cleaning robot to a charge station, comprising the steps of:
   (a) measuring a battery usable time, a running speed, and an actual return distance of a cleaning robot during a cleaning operation;
   (b) calculating an allowable return distance on the basis of the battery usable time and the running speed;
   (c) comparing the actual return distance with the allowable return distance;
   (d) returning the cleaning robot to the charge station when the actual return distance is larger than the allowable return distance as a result of the comparison; and
   wherein, in step (b), the allowable return distance is calculated using the following Formula $$\text{Allowable return distance} = \text{Battery usable} \times \text{Running speed} - \text{Allowable moving distance}. \quad \text{[Formula]}$$

2. The method according to claim 1, further comprising the step of:

(e) after recharging the cleaning robot returned to the charge station, periodically measuring the battery usable time during recharge of the cleaning robot, and performing a cleaning operation when the battery usable time is larger than a battery usable reference time.

3. The method according to claim 2, further comprising the step of: pre-setting at least one of the battery usable reference time and the allowable moving distance by a user.

4. The method according to claim 2, further comprising the step of:
(f) returning the cleaning robot to the charge station after completing the cleaning operation.

5. The method according to claim 1, wherein step (d) comprises the step of storing a current position of the cleaning robot before returning to the charge station.

6. The method according to claim 5, further comprising the step of:
(e) after recharging the cleaning robot returned to the charge station, periodically measuring the battery usable time during recharge of the cleaning robot, and moving to the stored position and performing a cleaning operation when the battery usable time is larger than a battery usable reference time.

7. A method for returning a cleaning robot to a charge station comprising the steps of:
(a) measuring a battery usable time when a cleaning robot is booted;
(b) determining whether the cleaning robot is connected to the charge station when the measured battery usable time is less than a battery usable reference time;
(c) starting to return to the charge station when the cleaning robot is not connected to the charge station, and measuring a running speed of the cleaning robot and an actual return distance;
(d) calculating an allowable return distance on the basis of the battery usable time and the running speed;
(e) comparing the actual return distance with the allowable return distance;
(f) generating an alarm when the actual return distance is larger than the allowable return distance as a result of the comparison; and
wherein, in step (d), the allowable return distance is calculated using the following Formula Allowable return distance=Battery usable×Running speed−Allowable moving distance. [Formula]

8. The method according to claim 7, further comprising the step of:
(g) starting to recharge the cleaning robot when the cleaning robot is connected to the charge station after generating the alarm.

9. The method according to claim 8, further comprising the step of:
(h) periodically measuring the battery usable time during recharge of the cleaning robot, and performing a cleaning operation when the battery usable time is larger than the battery usable reference time.

10. The method according to claim 9, wherein, when a cleaning start position is stored, step (h) comprises the step of moving to the stored position and performing a cleaning operation.

11. The method according to claim 7, further comprising the step of pre-setting at least one of the battery usable reference time and the allowable moving distance by a user.

12. An apparatus for returning a cleaning robot to a charge station, comprising:
a battery detection part for measuring a battery usable time of a cleaning robot;
a running speed detection part for measuring a running speed of the cleaning robot;
a return distance detection part for measuring an actual return distance of the cleaning robot;
a controller for comparing the actual return distance with an allowable return distance, and returning the cleaning robot to the charge station when the actual return distance is larger than the allowable return distance; and
wherein the controller calculates the allowable return distance using the following Formula Allowable return distance=Battery usable×Running speed−Allowable moving distance. [Formula]

13. The apparatus according to claim 12, wherein the battery detection part periodically measures the battery usable time to output the battery usable time to the controller, and the controller controls the cleaning robot to perform a cleaning operation when the measured battery usable time is larger than a battery usable reference time.

14. The apparatus according to claim 13, wherein the controller receives and stores at least one of the battery usable reference time and the allowable moving distance set by a user.

15. The apparatus according to claim 13, wherein the controller returns the cleaning robot to the charge station when the cleaning operation is completed.

16. The apparatus according to claim 12, wherein the controller stores a current position of the cleaning robot before returning to the charge station.

17. An apparatus for returning a cleaning robot to a charge station, comprising:
a battery detection part for measuring a battery usable time of the cleaning robot when the cleaning robot is booted;
a running speed detection part for measuring a running speed of the cleaning robot;
a return distance detection part for measuring an actual return distance of the cleaning robot;
a controller for calculating an allowable return distance on the basis of the battery usable time and the running speed when the battery usable time is less than a battery usable reference time and the cleaning robot is not connected to the charge station, and outputting an alarm when the actual return distance is larger than the allowable return distance; and
wherein the controller calculates the allowable return distance using the following Formula Allowable return distance=Battery usable×Running speed−Allowable moving distance. [Formula]

* * * * *